US011817762B2

(12) United States Patent
Yang et al.

(10) Patent No.: US 11,817,762 B2
(45) Date of Patent: Nov. 14, 2023

(54) MOTOR

(71) Applicant: HYUNDAI MOBIS Co., Ltd., Seoul (KR)

(72) Inventors: Hye Seong Yang, Yongin-si (KR); Hyun Ho Park, Yongin-si (KR); Yeong Woo Seo, Yongin-si (KR); Jung Kyu Yim, Yongin-si (KR); Yul Kyu Son, Yongin-si (KR); Seong Jun Hwang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 80 days.

(21) Appl. No.: 17/516,035

(22) Filed: Nov. 1, 2021

(65) Prior Publication Data

US 2022/0140691 A1    May 5, 2022

(30) Foreign Application Priority Data

Nov. 2, 2020 (KR) .................... 10-2020-0144445

(51) Int. Cl.
*H02K 3/50* (2006.01)
*H02K 3/52* (2006.01)
*H02K 5/22* (2006.01)
*H02K 3/28* (2006.01)

(52) U.S. Cl.
CPC .............. *H02K 5/225* (2013.01); *H02K 3/28* (2013.01); *H02K 3/50* (2013.01); *H02K 3/52* (2013.01); *H02K 3/522* (2013.01); *H02K 2203/09* (2013.01)

(58) Field of Classification Search
CPC ............ H02K 5/225; H02K 5/22; H02K 3/28; H02K 3/522; H02K 2203/09; H02K 3/52; H02K 3/50; H02K 3/505; H02K 3/46; H02K 11/33; H02K 3/38
USPC .......................................................... 310/71
See application file for complete search history.

(56) References Cited

U.S. PATENT DOCUMENTS

| 2011/0215662 A1* | 9/2011 | Lee ......................... H02K 5/225 310/71 |
| 2019/0296601 A1* | 9/2019 | Yamaguchi ........... H02K 5/1735 |
| 2020/0099270 A1* | 3/2020 | Kato .................... F16H 61/0003 |
| 2020/0395809 A1* | 12/2020 | Kim ....................... H02K 3/522 |

* cited by examiner

*Primary Examiner* — Alexander A Singh
(74) *Attorney, Agent, or Firm* — Morgan, Lewis & Bockius LLP

(57) ABSTRACT

The present disclosure relates to a motor including: a stator around which coils are wound; a terminal including a body disposed at one end of the stator, and terminal parts protruding from an inner peripheral surface of the body; a holder including a holder body configured to support the body, and a terminal holder part disposed on an inner peripheral surface of the holder body and configured to allow the terminal parts to be disposed thereon; and a support member configured to support the terminal holder part, thereby improving durability, stability, and reliability.

14 Claims, 12 Drawing Sheets

MOTOR

CROSS-REFERENCE TO RELATED APPLICATION

This application claims priority to and the benefit of Korean Patent Application No. 10-2020-0144445 filed in the Korean Intellectual Property Office on Nov. 2, 2020, the entire contents of which are incorporated herein by reference.

TECHNICAL FIELD

The present disclosure relates to a motor, and more particularly, to a motor capable of improving durability, stability, and reliability.

BACKGROUND ART

A hybrid vehicle or an electric vehicle, which is called an environmentally friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around the stator cores.

A busbar is disposed at an upper side of the stator, and the stator coils are connected to an external power source through the busbar.

The busbar may be structured to include a plurality of terminals inside a ring-shaped holder, and the terminals may be constituted as a combination of phase terminals connected to U-phase, V-phase, and W-phase power sources, and a neutral terminal that connects the phase terminals.

The stator coils are fused with terminal parts of the terminals by being welded to the terminal parts of the terminals (e.g., welded by applying electric current) in a state in which the stator coils are compressed. After the terminal parts of the terminals are fused with the stator coils, an insulating material (e.g., epoxy) for insulation between the terminals is applied to cover the terminal parts of the terminals.

Meanwhile, when the motor vibrates or external impact is applied to the motor, the fused portion of the stator coil, whose strength becomes low, is damaged or separated from the terminal part of the terminal.

In particular, unlike an outermost peripheral portion of the holder (an outermost portion in a radial direction of the holder) to which a fastening member is fastened, an innermost peripheral portion of the holder (an innermost portion in the radial direction of the holder), on which the terminal part fused with the stator coil is disposed, is disposed in the form of a cantilever, which causes an increase in displacement of the innermost peripheral portion of the holder (the displacement of the innermost peripheral portion of the holder is larger than the displacement of the outermost peripheral portion of the holder) when vibration occurs. As a result, there is a problem in that the holder is vulnerable to vibration.

Therefore, recently, various studies have been conducted to improve durability, stability, and reliability of the coil, but the study results are still insufficient. Accordingly, there is a need to develop a technology to improve durability, stability, and reliability of the coil.

SUMMARY

The present disclosure has been made in an effort to provide a motor capable of improving durability, stability, and reliability.

In particular, the present disclosure has been made in an effort to minimize displacement of an innermost peripheral portion of a busbar, damage to a coil, and deterioration in durability when vibration occurs.

The present disclosure has also been made in an effort to reduce vibration and noise.

The present disclosure has also been made in an effort to simplify a structure and reduce costs.

The objects to be achieved by the embodiments are not limited to the above-mentioned objects, but also include objects or effects that may be understood from the solutions or embodiments described below.

An exemplary embodiment of the present disclosure provides a motor including: a stator around which coils are wound; a terminal including a body disposed at one end of the stator, and terminal parts protruding from an inner peripheral surface of the body; a holder including a holder body configured to support the body, and a terminal holder part disposed on an inner peripheral surface of the holder body and configured to allow the terminal parts to be disposed thereon; and a support member configured to support the terminal holder part.

This is to improve durability, stability, and reliability of the motor.

That is, in the related art, unlike an outermost peripheral portion of the holder (an outermost portion in a radial direction of the holder) to which a fastening member is fastened, an innermost peripheral portion of the holder (an innermost portion in the radial direction of the holder), on which the terminal part fused with the stator coil is disposed, is disposed in the form of a cantilever, which causes an increase in displacement of the innermost peripheral portion of the holder (the displacement of the innermost peripheral portion of the holder is larger than the displacement of the outermost peripheral portion of the holder) when vibration occurs. As a result, there is a problem in that the terminal holder part is vulnerable to vibration, and a fused portion of the coil, whose strength becomes low, is damaged or separated from the terminal part of the terminal.

However, according to the embodiment of the present disclosure, the support members support the terminal holder part, which makes it possible to minimize an increase in displacement of the terminal holder part. Therefore, it is possible to obtain an advantageous effect of minimizing the damage to and deformation of the coil and minimizing the separation of the coil from the terminal part when the motor vibrates or external impact is applied.

According to the exemplary embodiment of the present disclosure, the stator may include: a plurality of split cores arranged to cooperatively define a ring shape; and a support ring disposed to surround outer circumferential surfaces of the plurality of split cores.

According to the exemplary embodiment of the present disclosure, terminal holes may penetrate the terminal holder part, and an end of the coil may pass through the terminal hole and be electrically connected to the terminal part.

The terminal holder part may have various structures capable of supporting the terminal parts. For example, one end of the terminal holder part may be fixed to the inner peripheral surface of the holder body, and the other end of the terminal holder part may be disposed as a free end.

The support member may have various structures capable of supporting the terminal holder part.

According to the exemplary embodiment of the present disclosure, a first end of the support member may be connected to the terminal holder part, and a second end of the support member may be coupled to the housing. In particular, the support member may be integrated with the holder by injection molding.

Since the first end of the support member is integrally connected to the terminal holder part as described above, it is possible to support the terminal holder part (fix the terminal holder part to the housing) only by performing a process of coupling the second end of the support member to the housing without performing a separate coupling process of coupling the support member to the terminal holder part. Therefore, it is possible to obtain an advantageous effect of simplifying the structure and the assembly process.

The structure for coupling the support member and the housing may be variously changed in accordance with required conditions and design specifications.

For example, the motor may include: a coupling hole formed in the housing; and a snap-fit coupling part disposed at the second end of the support member and coupled to the coupling hole in a snap-fit manner.

According to the embodiment of the present disclosure, the snap-fit coupling part disposed at the second end of the support member may be coupled to the coupling hole formed in the housing, and the terminal holder part may be supported on (fixed to) the housing by means of the support member. Therefore, it is possible to obtain an advantageous effect of minimizing an increase in displacement of the terminal holder part (i.e., an increase in displacement of the coil disposed on the terminal holder part).

In addition, when the posture and position of the snap-fit coupling part are misaligned with the coupling hole, the snap-fit coupling part cannot be accurately inserted into the coupling hole, and the holder (the busbar unit) is disposed in an abnormal posture with respect to the housing. Therefore, an operator may easily recognize whether the busbar unit is incorrectly assembled.

The coupling hole may be provided in various ways in accordance with required conditions and design specifications.

For example, the coupling hole may penetrate one surface of the housing that faces the holder.

As another example, a catching projection may protrude from one surface of the housing that faces the holder, and the coupling hole may be formed in the catching projection.

According to the exemplary embodiment of the present disclosure, the motor may include: a locking protrusion bent at the second end of the support member; and a locking part disposed on the housing and configured to selectively lock the locking protrusion in accordance with a rotation of the housing relative to the holder.

The locking part may have various structures capable of locking the locking protrusion in accordance with the rotation of the housing relative to the holder.

For example, the locking part may include: a locking block having an insertion hole into which the locking protrusion is inserted; and an accommodation portion provided in the locking block so as to communicate with the insertion hole and configured to selectively accommodate the locking protrusion in accordance with the rotation of the housing relative to the holder, and the locking protrusion may be locked to an inner surface of the locking block when the locking protrusion is accommodated in the accommodation portion.

According to the exemplary embodiment of the present disclosure, the holder may include first ribs provided on one surface of the terminal holder part and each disposed between the adjacent terminal parts.

Since the first rib is disposed between the terminal parts as described above, it is possible to obtain an advantageous effect of improving insulation performance and ensuring a creeping distance for electrical insulation between the terminal parts (between the terminals).

Moreover, since the first rib is disposed between the terminal parts, a space (vacant space) between the terminal parts may be minimized. Therefore, it is possible to obtain an advantageous effect of reducing the amount of insulating materials (e.g., epoxy) applied to cover the coils fused with the terminal parts and reducing costs.

In particular, the first rib may continuously block, by extending in a diameter direction of the holder, a portion between the adjacent terminal parts.

Since the first rib continuously blocks the portion between the terminal parts as described above, it is possible to increase a weight of the terminal holder part while ensuring insulation performance between the terminal parts. Therefore, it is possible to obtain an advantageous effect of more effectively inhibiting an increase in displacement of the terminal holder part (inhibiting vibration in proportion to an increase in weight).

Among other things, the innermost peripheral portion of the terminal holder part, which is most greatly displaced in the terminal holder part, is connected to the holder body by means of the first ribs. Therefore, it is possible to obtain an advantageous effect of minimizing an increase in displacement of the terminal holder part.

According to the exemplary embodiment of the present disclosure, the holder may include second ribs provided on the other surface of the terminal holder and each disposed between the adjacent coils.

Since the second rib is disposed between the adjacent coils as described above, it is possible to obtain an advantageous effect of improving insulation performance and more effectively inhibiting vibration and noise.

According to the exemplary embodiment of the present disclosure, the motor may include an elastic layer disposed to surround at least a part of a peripheral surface of the holder.

For example, the support ring may partially surround the peripheral surface of the holder, and the elastic layer may be interposed between the holder and the support ring.

As described above, the elastic layer is disposed to surround at least a part of the peripheral surface of the holder, and the elastic layer is interposed between the holder and the support ring. Therefore, it is possible to inhibit a gap or interval from being formed between the holder and the support ring. As a result, it is possible to obtain an advantageous effect of inhibiting impact and noise caused by the contact between the holder and the support ring when vibration occurs.

DETAILED DESCRIPTION

Figure 1:
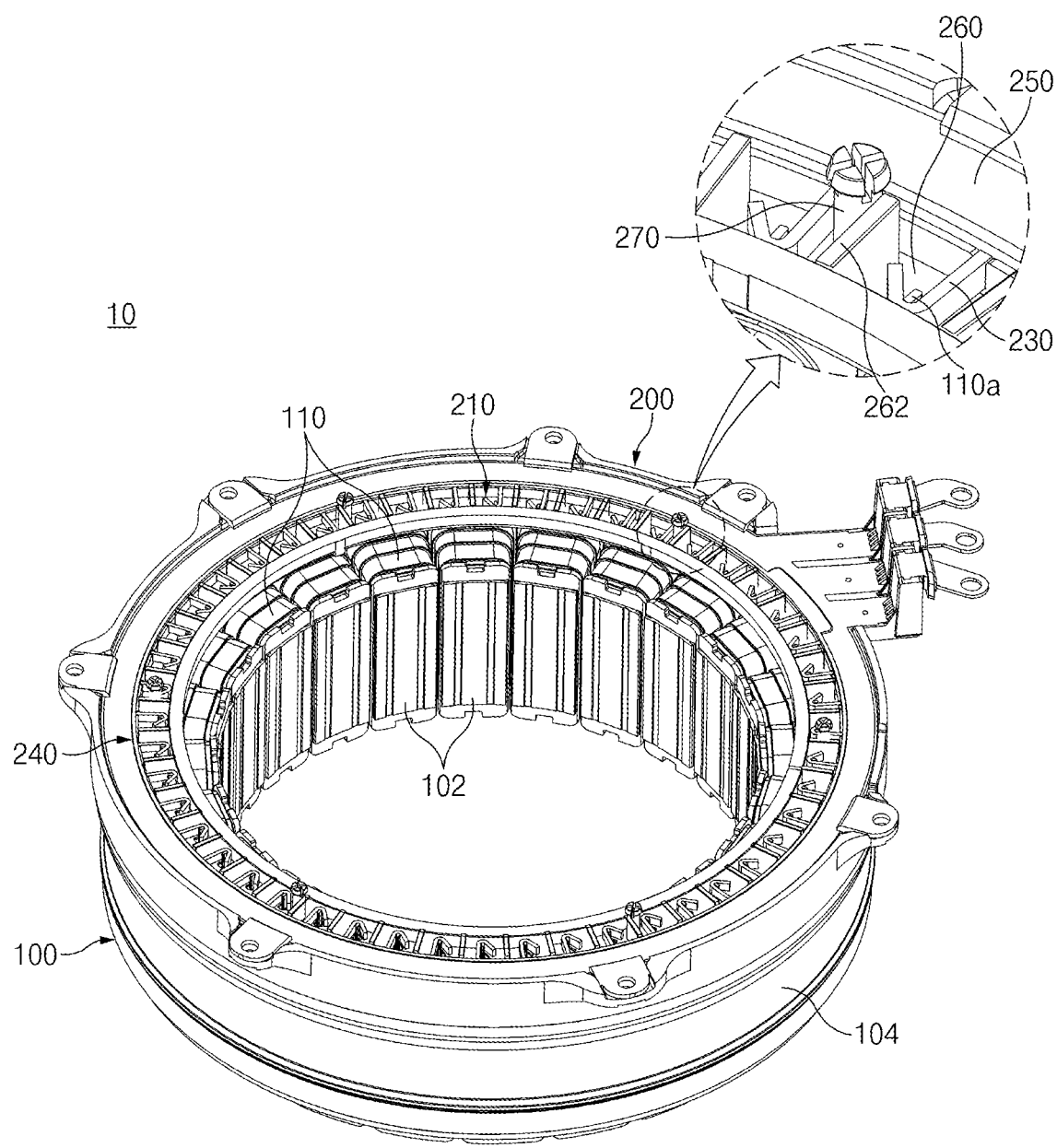
FIG. 1 is a view for explaining a motor according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 12, a motor 10 according to an embodiment of the present disclosure includes: a stator 100 around which coils 110 are wound; terminals 210 each including a body 220 disposed at one end of the stator 100, and terminal parts 230 protruding from an inner peripheral surface of the body 220; a holder 240 including a holder body 250 configured to support the bodies 220, and a terminal holder part 260 disposed on an inner peripheral surface of the holder body 250 and configured to allow the terminal parts 230 to be disposed thereon; and support members 270 configured to support the terminal holder part 260.

For reference, the motor 10 according to the embodiment of the present disclosure may be mounted in various subjects in accordance with required conditions and design specifications. The present disclosure is not restricted or limited by the type and structure of the subject.

For example, the motor 10 according to the embodiment of the present disclosure may be used as a drive motor for an environmentally friendly vehicle, such as a hybrid vehicle and/or an electric vehicle, which obtains driving power from electrical energy.

For example, the drive motor may be an inner-rotor-type synchronous motor and include the stator 100 seated on a housing 300, and a rotor (not illustrated) rotatably installed in the stator 100 with a predetermined air gap from the stator 100. A busbar unit 200 may be connected to the stator 100.

The stator 100 may be seated on the housing 300. The coils 110 are wound around the stator 100 to induce an electrical interaction between the stator and the rotor.

For example, the stator 100 may include a plurality of split cores 102 configured to cooperatively define a ring shape, and a support ring 104 configured to surround outer peripheral surfaces of the plurality of split cores 102.

The split core 102 may be variously changed in number and structure in accordance with required conditions and design specifications. The present disclosure is not restricted or limited by the number of split cores 102 and the structure of the split core 102.

More specifically, the split core 102 may be configured by stacking a plurality of electrical steel sheets in an axial direction of the rotor.

A bobbin (not illustrated) (made of plastic, for example) is provided around each of the split cores 102, and the coil 110 is wound around the bobbin.

In the embodiment of the present disclosure illustrated and described above, the example has been described in which the stator 100 includes the plurality of split cores 102. However, according to another embodiment of the present disclosure, the stator may include a single core.

The support ring 104 is provided in the form of a hollow ring. The support ring 104 may be coupled to surround and be in close contact with the outer peripheral surfaces of the plurality of split cores 102.

For example, the support ring 104 may be coupled in a hot press-fit manner to surround the entire outer peripheral surfaces of the split cores 102. Further, the support ring 104 may be disposed to surround a part of a peripheral surface of the holder 240.

The rotor is configured to be rotated by an electrical interaction between the rotor and the stator 100.

For example, the rotor may include a rotor core (not illustrated) and magnets (not illustrated). The rotor core may be structured by stacking a plurality of circular plates each provided in the form of a thin steel sheet or structured in the form of a bin.

A hole (not illustrated) may be formed at a center of the rotor, and a shaft may be coupled to the hole. Protrusions (not illustrated) may protrude from an outer peripheral surface of the rotor core and guide the magnets. The magnets may be attached to the outer peripheral surface of the rotor core and spaced apart from one another at predetermined intervals in a peripheral direction of the rotor core.

In addition, the rotor may include a can member (not illustrated) disposed to surround the magnets and configured to inhibit the separation of the magnets.

The busbar unit 200 may include the terminals 210 and the holder 240 and be disposed above (or below) the stator 100.

The terminals 210 electrically connect the coils 110 of the stator 100 to an external power source.

Figure 4:
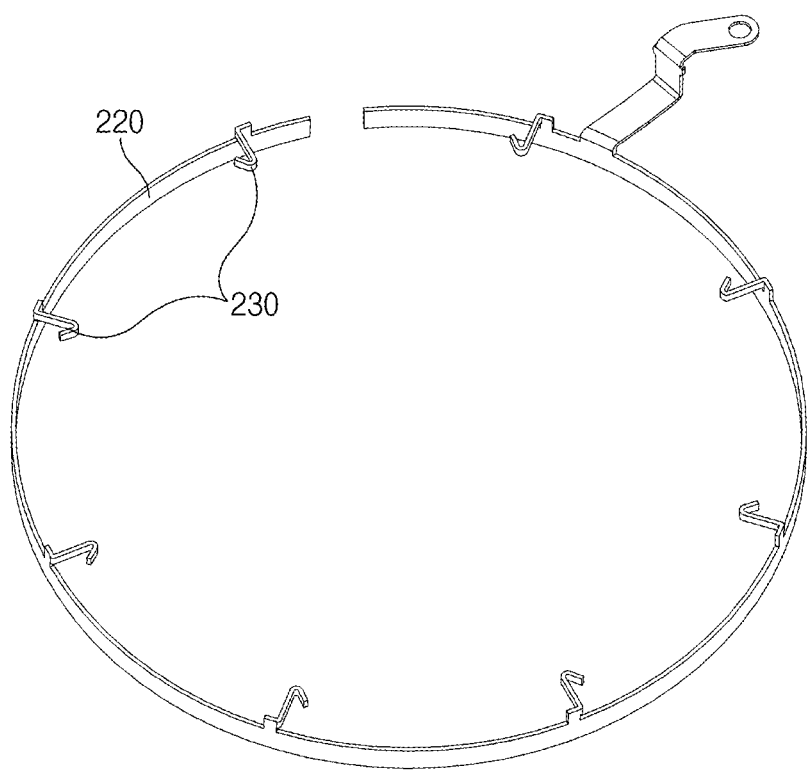
FIG. 4 is a view for explaining a terminal of the motor according to the embodiment of the present disclosure.

Referring to FIG. 4, the terminal 210 may be at least one of phase terminals (a U-phase terminal, a V-phase terminal, and a W-phase terminal) respectively connected to a U-phase power source, a V-phase power source, and a W-phase power source and a neutral terminal for electrically connecting the phase terminals. For example, the busbar unit 200 may include a total of four terminals (the U-phase terminal, the V-phase terminal, the W-phase terminal, and the neutral terminal).

More specifically, the terminal 210 includes the body 220 accommodated in the holder 240, and the terminal parts 230 protruding from the inner peripheral surface of the body 220 and connected to the coils 110.

The body 220 may be variously changed in structure and shape in accordance with required conditions and design specifications. For example, the body 220 may have a single-layered structure and be provided as a band member in the form of an arc (or a ring) having a predetermined curvature.

According to another embodiment of the present disclosure, the body may have a double-layered structure (multilayer structure) having a bent portion.

The terminal part 230 is disposed on the inner peripheral surface of the body 220, and an end 110a of the coil 110 of the stator 100 is connected to the terminal part 230.

The terminal part 230 may have various structures capable of being electrically connected to (e.g., fused with) the end 110a of the coil 110. The present disclosure is not restricted or limited by the structure and shape of the terminal part 230.

In addition, the terminal 210 may include a power terminal part (not illustrated) protruding from an outer peripheral surface of the holder 240.

The power terminal part extends from an outer surface of the body 220 and protrudes from the outer peripheral surface of the holder 240. The power terminal part may be electrically connected to each of external power cables corresponding to the respective phases (the U-phase, the V-phase, and the W-phase).

The holder 240 supports the arrangement state of the terminals 210 and electrically insulates the terminals 210.

More specifically, the holder 240 includes the holder body 250 configured to support the bodies 220, and the terminal holder part 260 disposed on the inner peripheral surface of the holder body 250 and configured to allow the terminal parts 230 to be disposed (e.g., seated) thereon.

The holder body 250 may be variously changed in material and shape in accordance with required conditions and design specifications. The present disclosure is not restricted or limited by the material and shape of the holder body 250.

For example, the holder body 250 may be provided in the form of a hollow ring that surrounds the body 220. The holder body 250 may be configured as a molded product (made of an insulating material, for example) provided by injection molding.

The terminal holder part 260 is integrated with the inner peripheral surface of the holder body 250 and partially covers an upper region of the stator 100 (i.e., upper regions of the coils 110). The terminal holder part 260 supports the terminal parts 230.

For example, terminal holes 260a penetrate the terminal holder part 260. The end 110a of the coil 110 may pass through the terminal hole 260a and be electrically connected to the terminal part 230 disposed above the terminal holder part 260 (based on FIG. 1). The terminal hole 260a may have various structures through which the end 110a of the coil 110 may pass.

The terminal holder part 260 may have various structures capable of supporting the terminal parts 230. The present disclosure is not restricted or limited by the structure of the terminal holder part 260. For example, one end (an outer peripheral end) of the terminal holder part 260 may be fixed to the inner peripheral surface of the holder body 250, and the other end (an inner peripheral end) of the terminal holder part 260 may be provided in the form of a cantilever disposed as a free end.

In particular, the terminal holder part 260 may be integrated with the holder body 250 by injection molding. According to another embodiment of the present disclosure, the terminal holder part may be manufactured separately and then coupled to the holder body.

The support members 270 support the terminal holder part 260.

This is to minimize displacement of an innermost peripheral portion of the busbar unit 200 (i.e., an innermost portion of a radial direction of the holder 240) and minimize damage to the coil 110 and a deterioration in durability of the coil 110 when vibration and impact occurs.

That is, because an outermost peripheral portion of the holder 240 (i.e., an outermost portion in the radial direction of the holder 240) is fixed by a fastening member (not illustrated), an increase in displacement of the outermost peripheral portion of the holder 240 caused by vibration may be inhibited. In contrast, since the terminal holder part 260, which corresponds to the innermost peripheral portion of the holder 240, is provided in the form of a cantilever, the displacement of the terminal holder part 260 is larger than the displacement of the outermost peripheral portion of the holder 240 when vibration occurs. As a result, there is a problem in that the terminal holder part 260 is vulnerable to vibration, and a fused portion of the coil 110, whose strength becomes low, is damaged or separated from the terminal part 230 of the terminal 210.

However, according to the embodiment of the present disclosure, the support members 270 support the terminal holder part 260, which makes it possible to minimize an increase in displacement of the terminal holder part 260. Therefore, it is possible to obtain an advantageous effect of minimizing the damage to and deformation of the coil 110 and minimizing the separation of the coil 110 from the terminal part 230 when the motor 10 vibrates or external impact is applied.

The support member 270 may have various structures capable of supporting the terminal holder part 260. The present disclosure is not restricted or limited by the structure of the support member 270.

Figure 5:
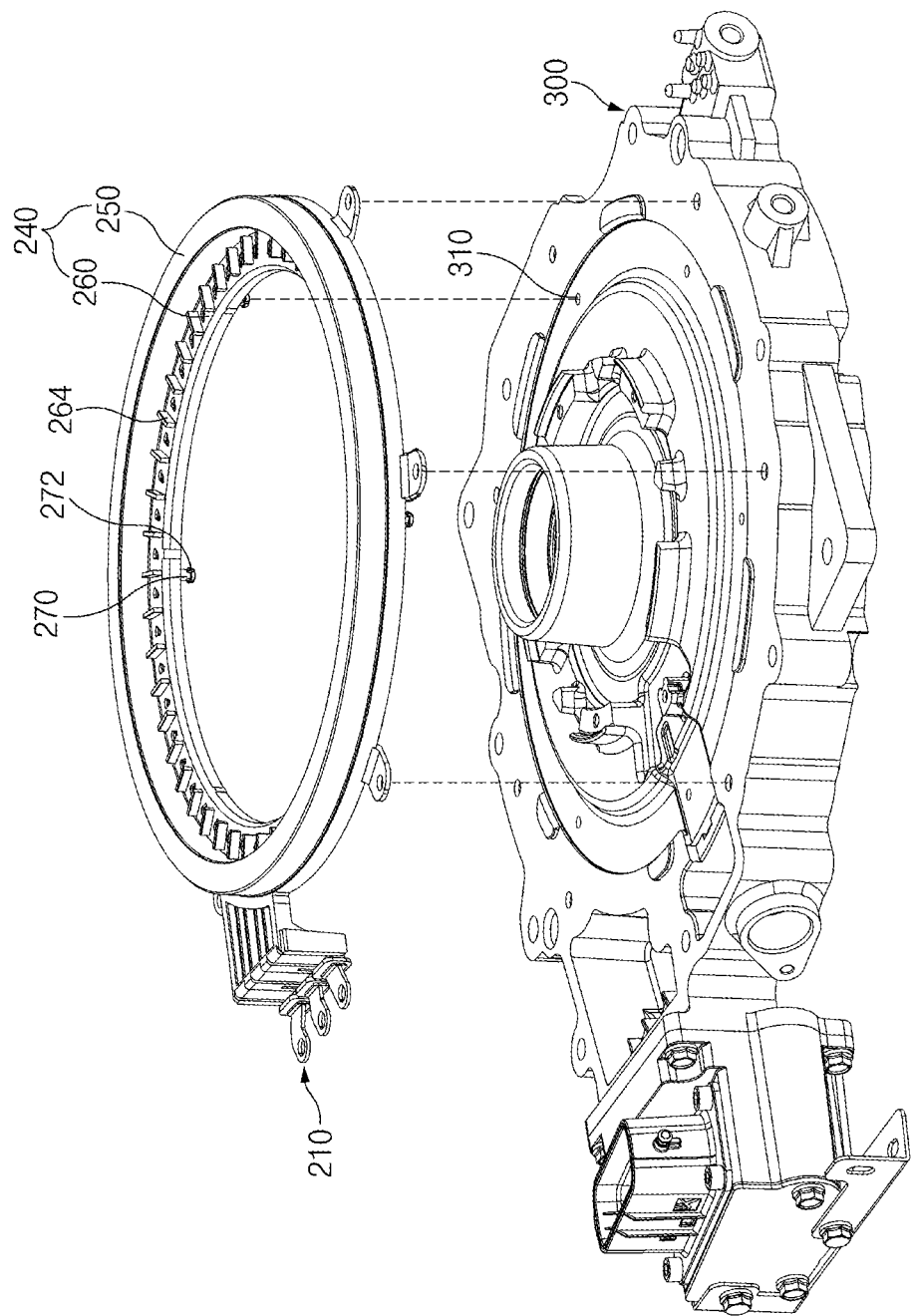
FIG. 5 is a view for explaining a housing of the motor according to the embodiment of the present disclosure.

Referring to FIG. 5, according to the exemplary embodiment of the present disclosure, one end of the support member 270 may be connected to the terminal holder part 260, and the other end of the support member 270 may be coupled to the housing 300.

In particular, the support member 270 may be integrated with the holder 240 by injection molding.

Since one end of the support member 270 is integrally connected to the terminal holder part 260 as described above, it is possible to support the terminal holder part 260 (fix the terminal holder part 260 to the housing) only by performing a process of coupling the other end of the support member 270 to the housing 300 without performing a separate coupling process of coupling the support member 270 to the terminal holder part 260. Therefore, it is possible to obtain an advantageous effect of simplifying the structure and the assembly process.

For example, the support member 270 has a straight rod shape having a circular cross-section. The support member 270 may protrude from one surface (an upper surface based on FIG. 1) of the terminal holder part 260 that faces the housing 300. According to another embodiment of the present disclosure, the support member may have a curved structure or other cross-sectional shapes.

The structure for coupling the support member 270 and the housing 300 may be variously changed in accordance with required conditions and design specifications.

Figure 6:
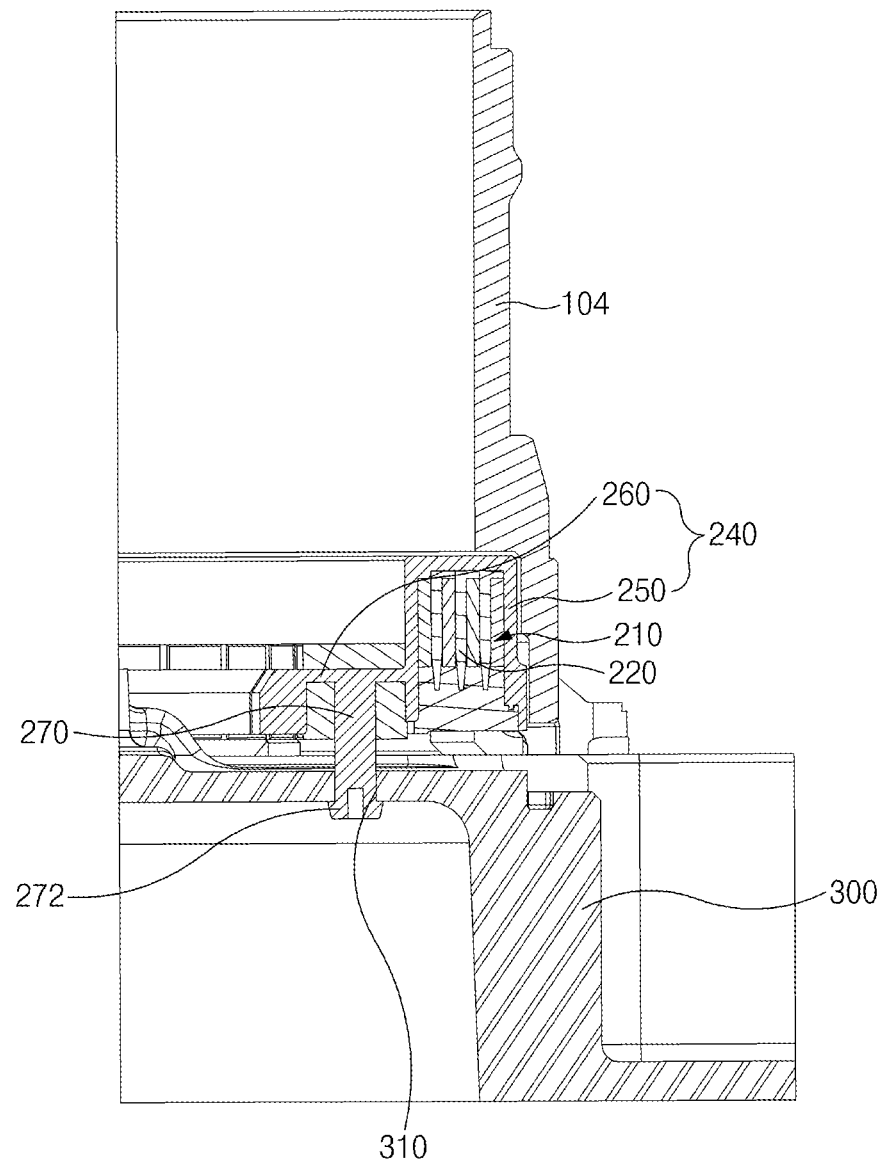
FIG. 6 is a view for explaining a snap-fit coupling part of the motor according to the embodiment of the present disclosure.

For example, referring to FIG. 6, the motor 10 may include coupling holes 310 formed in the housing 300. The motor 10 may include a snap-fit coupling part 272 disposed at the other end of the support member 270 and configured to be coupled to the coupling hole 310 in a snap-fit manner.

The snap-fit coupling part 272 may be elastically coupled to the coupling hole 310 in a snap-fit manner using elasticity of a material (e.g., a plastic material). The present disclosure is not restricted or limited by the shape and structure of the snap-fit coupling part 272.

According to the embodiment of the present disclosure, the snap-fit coupling part 272 disposed at the other end of the support member 270 may be coupled to the coupling hole 310 formed in the housing 300, and the terminal holder part 260 may be supported on (fixed to) the housing 300 by means of the support member 270. Therefore, it is possible to obtain an advantageous effect of minimizing an increase in displacement of the terminal holder part 260 (i.e., an increase in displacement of the coil disposed on the terminal holder part).

In addition, when the posture and position of the snap-fit coupling part 272 are misaligned with the coupling hole 310, the snap-fit coupling part 272 cannot be accurately inserted into the coupling hole 310, and the holder 240 (the busbar unit) is disposed in an abnormal posture with respect to the housing 300. Therefore, an operator may easily recognize whether the busbar unit 200 is incorrectly assembled.

For reference, the coupling hole 310 to which the snap-fit coupling part 272 is coupled may be formed in various ways in accordance with required conditions and design specifications.

For example, referring to FIG. 6, the coupling hole 310 may penetrate one surface (the upper surface based on FIG. 6) of the housing 300 that faces the holder 240.

Figure 7:
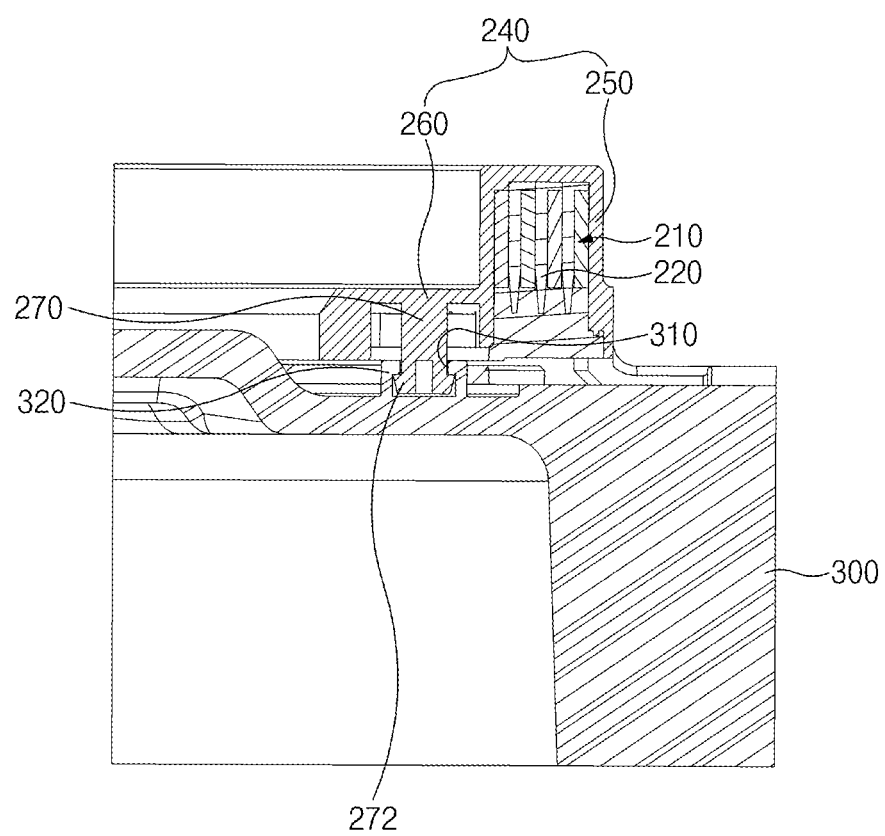
FIG. 7 is a view for explaining a catching projection of the motor according to the embodiment of the present disclosure.
Figure 8:
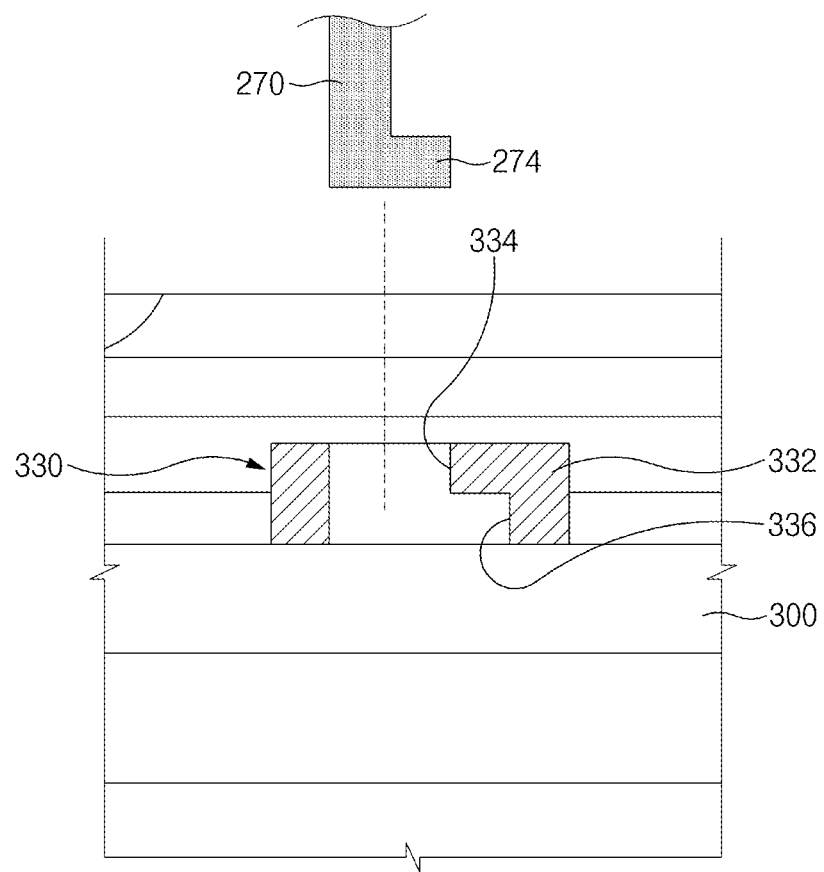
FIGS. 8 and 9 are views for explaining a locking part of the motor according to the embodiment of the present disclosure.
Figure 9:
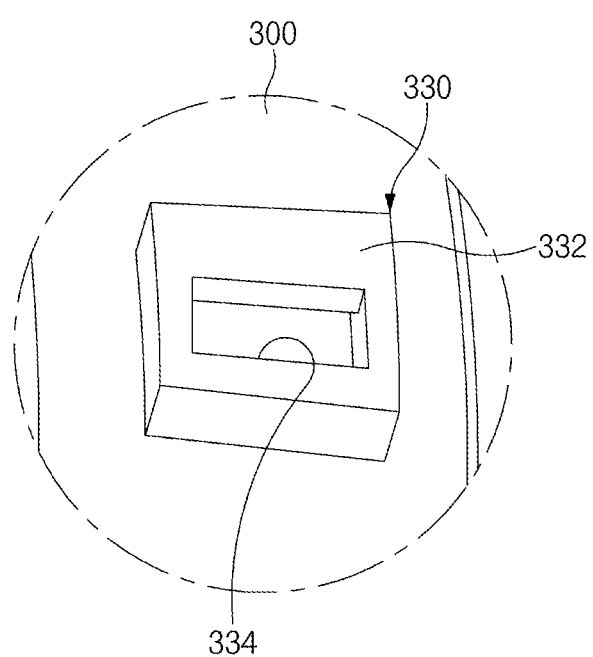

Alternatively, as illustrated in FIG. 7, a catching projection 320 may protrude from one surface (the upper surface based on FIG. 7) of the housing 300 that faces the holder 240, and the coupling hole 310 may be formed in the catching projection 320.

Referring to FIGS. 8 to 11, according to another embodiment of the present disclosure, the motor 10 may include a locking protrusion 274 bent at the other end of the support member 270, and a locking part 330 disposed on the housing 300 and configured to selectively lock the locking protrusion 274 in accordance with a rotation of the housing 300 relative to the holder 240. The support member 270 may be coupled to the housing 300 by means of the locking protrusion 274 and the locking part 330.

For example, the locking protrusion 274 may be bent at the other end (a lower end based on FIG. 8) of the support member 270 so that the locking protrusion 274 and the support member 270 cooperatively define an approximately "L" shape.

The locking part 330 may have various structures capable of locking the locking protrusion 274 in accordance with the rotation of the housing 300 relative to the holder 240 (a rotation about an axis of the stator). The present disclosure is not restricted or limited by the structure and shape of the locking part 330.

For example, the locking part 330 may include a locking block 332 having an insertion hole 334 into which the locking protrusion 274 is inserted, and an accommodation portion 336 disposed in the locking block 332 so as to communicate with the insertion hole 334 and configured to selectively accommodate the locking protrusion 274 in accordance with the rotation of the housing 300 relative to the holder 240. The locking protrusion 274 may be locked to an inner surface of the locking block 332 when the locking protrusion 274 is accommodated in the accommodation portion 336.

Figure 10:
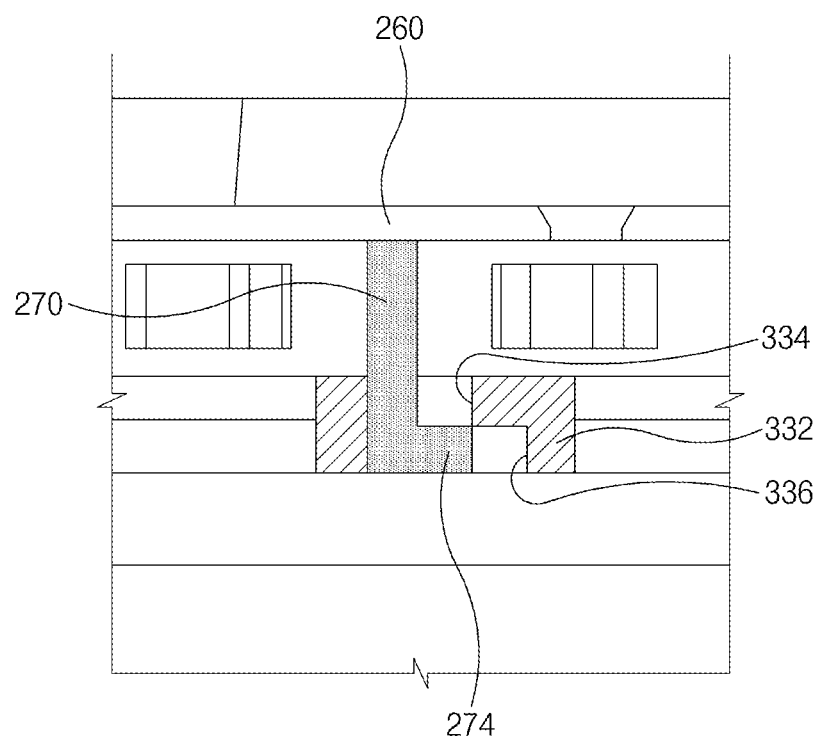
FIGS. 10 and 11 are views for explaining a locked state implemented by a locking protrusion of the motor according to the embodiment of the present disclosure.

Referring to FIG. 10, the locking protrusion 274 may be inserted into the locking block 332 through the insertion hole 334 in an upward/downward direction (based on FIG. 10).

Figure 11:
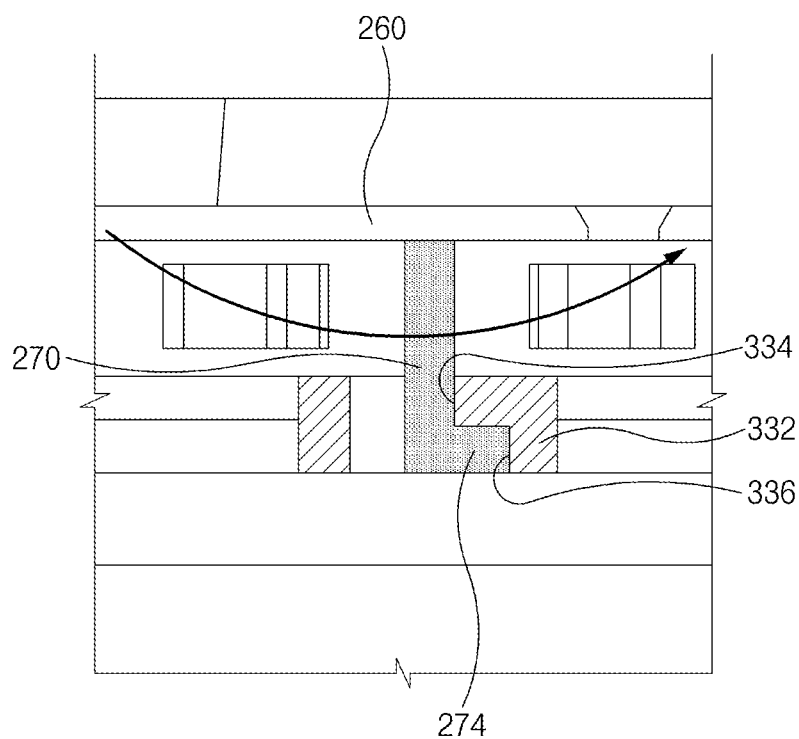

Referring to FIG. 11, when the holder 240 rotates (e.g., rotates counterclockwise) relative to the housing 300 in a state in which the locking protrusion 274 is disposed in the locking block 332, the locking protrusion 274 may be accommodated in the accommodation portion 336, and the locking protrusion 274 may be locked to the inner surface of the locking block 332.

In the state in which the locking protrusion 274 is locked to the inner surface of the locking block 332 (the locking protrusion 274 is accommodated in the accommodation portion 336), the arrangement state of the holder 240 relative to the housing 300 may be fixed (the movement of the holder 240 in the upward/downward direction may be restricted), and the terminal holder part 260 may be supported on the housing 300 by means of the support member 270.

Figure 2:
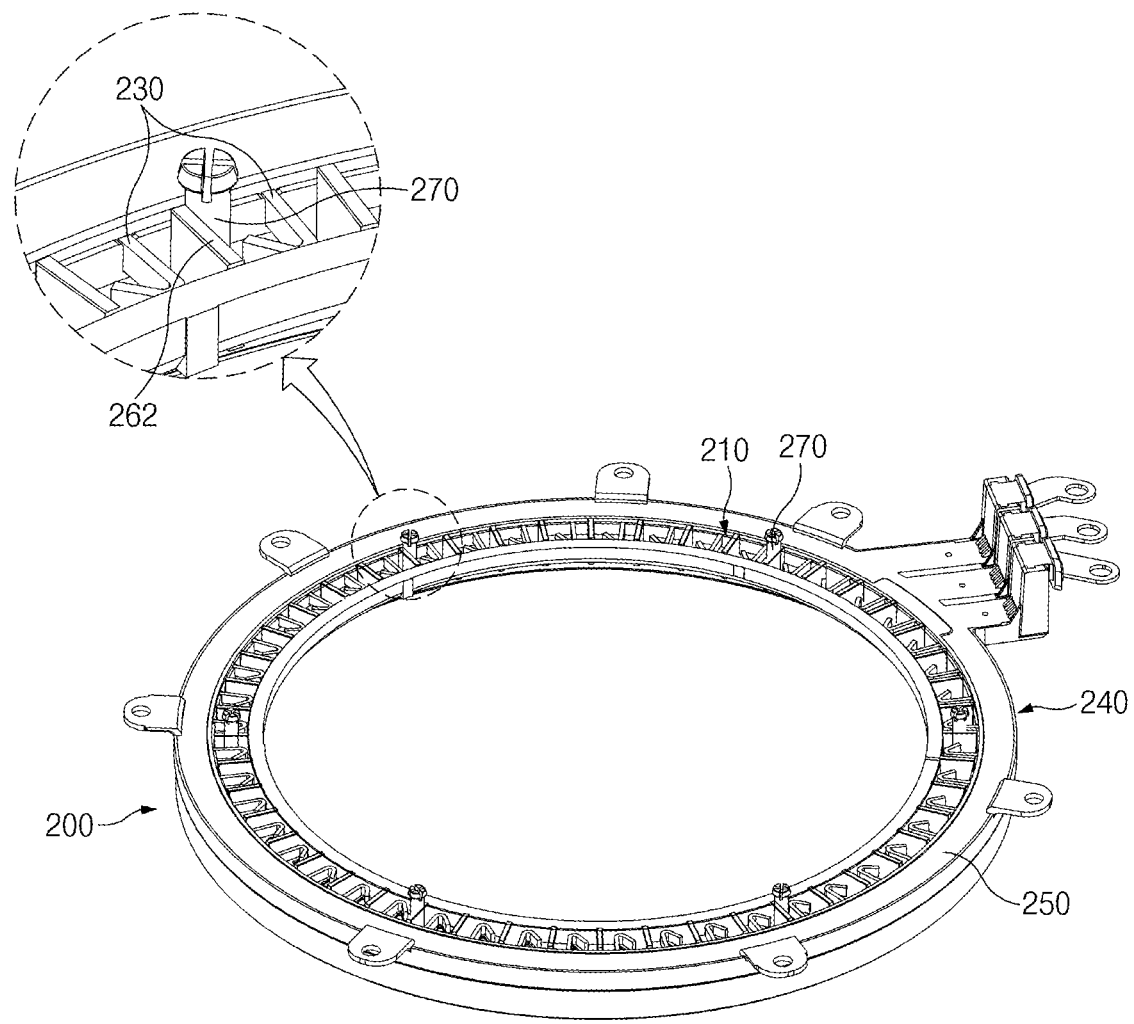
FIGS. 2 and 3 are views for explaining a busbar unit of the motor according to the embodiment of the present disclosure.

Referring to FIGS. 1 and 2, according to the exemplary embodiment of the present disclosure, the holder 240 may include first ribs 262 provided on one surface of the terminal holder part 260 and each disposed between the adjacent terminal parts 230.

Since the first rib 262 is disposed between the terminal parts 230 as described above, it is possible to obtain an advantageous effect of improving insulation performance and ensuring a creeping distance for electrical insulation between the terminal parts 230 (between the terminals).

Moreover, since the first rib 262 is disposed between the terminal parts 230, a space (vacant space) between the terminal parts 230 may be minimized. Therefore, it is possible to obtain an advantageous effect of reducing the amount of insulating materials (e.g., epoxy) applied to cover the coils 110 fused with the terminal parts 230 and reducing costs.

In particular, the first rib 262 may continuously block, by extending in a diameter direction of the holder 240, a portion between the adjacent terminal parts 230.

More particularly, the first rib 262 may be integrated with the holder 240 by injection molding.

In this case, the configuration in which the first rib 262 continuously blocks the portion between the adjacent terminal parts 230 may mean that the first rib 262 continuously connects an inner peripheral surface of the holder body 250 to an innermost periphery of the terminal holder part 260.

Since the first rib 262 continuously blocks the portion between the terminal parts 230 as described above, it is possible to increase a weight of the terminal holder part 260 while ensuring insulation performance between the terminal parts 230. Therefore, it is possible to obtain an advantageous effect of more effectively inhibiting an increase in displacement of the terminal holder part 260 (inhibiting vibration in proportion to an increase in weight).

Among other things, the innermost peripheral portion of the terminal holder part 260, which is most greatly displaced in the terminal holder part 260, is connected to the holder body 250 by means of the first ribs 262. Therefore, it is possible to obtain an advantageous effect of minimizing an increase in displacement of the terminal holder part 260.

Figure 3:
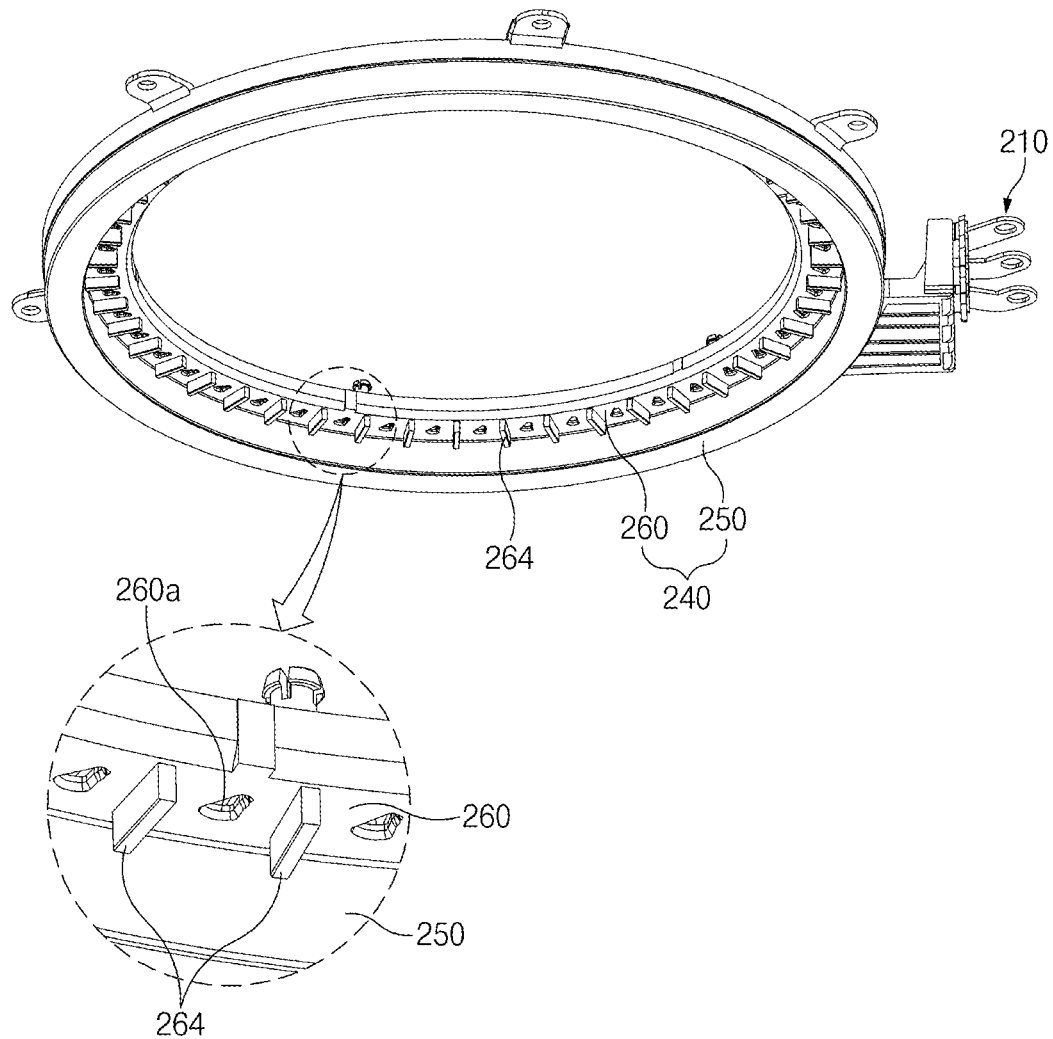

Referring to FIG. 3, according to the exemplary embodiment of the present disclosure, the holder 240 may include second ribs 264 provided on the other surface of the terminal holder 240 and each disposed between the adjacent coils 110.

In particular, the second rib 264 may be integrated with the holder 240 by injection molding.

Since the second rib 264 is disposed between the adjacent coils 110 (between extension lines of the coils 110) as described above, it is possible to obtain an advantageous effect of improving insulation performance and more effectively inhibiting vibration and noise.

According to the exemplary embodiment of the present disclosure, the motor 10 may include an elastic layer 280 configured to surround at least a part of a peripheral surface of the holder 240.

Figure 12:
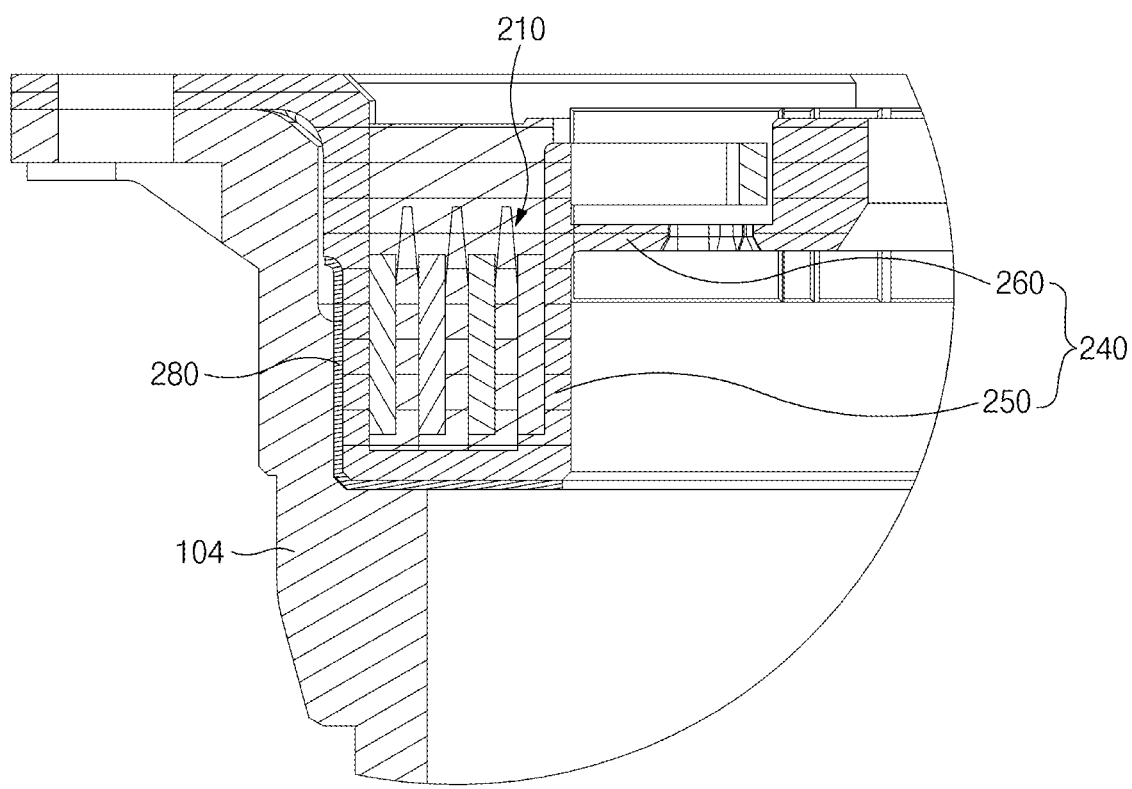
FIG. 12 is a view for explaining an elastic layer of the motor according to the embodiment of the present disclosure.

For example, referring to FIG. 12, the support ring 104 may partially surround the peripheral surface of the holder 240, and the elastic layer 280 may be interposed between the holder 240 and the support ring 104.

The elastic layer 280 may be formed by applying an elastic material such as rubber or silicone or performing dual-injection molding. The present disclosure is not restricted or limited by the material of the elastic layer 280 and the method of forming the elastic layer 280.

As described above, the elastic layer 280 is disposed to surround at least a part of the peripheral surface of the holder 240, and the elastic layer 280 is interposed between the holder 240 and the support ring 104. Therefore, it is possible to inhibit a gap or interval from being formed between the holder 240 and the support ring 104. As a result, it is possible to obtain an advantageous effect of inhibiting impact and noise caused by the contact between the holder 240 and the support ring 104 when vibration occurs.

According to the embodiment of the present disclosure described above, it is possible to obtain an advantageous effect of improving durability, stability, and reliability.

In particular, according to the embodiment of the present disclosure, it is possible to obtain an advantageous effect of minimizing the displacement of the innermost peripheral portion of the busbar and minimizing damage to the coil and a deterioration in durability of the coil when vibration occurs.

In addition, according to the embodiment of the present disclosure, it is possible to obtain an advantageous effect of reducing vibration and noise.

In addition, according to the embodiment of the present disclosure, it is possible to obtain an advantageous effect of simplifying the structure and reducing the costs.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A motor comprising:
a stator around which coils are wound;
a terminal comprising a body disposed at one end of the stator, and terminal parts protruding from an inner peripheral surface of the body;
a holder comprising a holder body configured to support the body, and a terminal holder part disposed on an inner peripheral surface of the holder body, the terminal holder part being configured to allow the terminal parts to be disposed thereon;
a support member configured to support the terminal holder part; and
a housing on which the holder is seated,
wherein a first end of the support member is connected to the terminal holder part, and a second end of the support member is coupled to the housing,
a coupling hole is formed in the housing, and
a snap-fit coupling part is disposed at the second end of the support member and coupled to the coupling hole in a snap-fit manner.

2. The motor of claim 1, wherein the coupling hole penetrates one surface of the housing that faces the holder.

3. The motor of claim 1, comprising:
a catching projection disposed on one surface of the housing that faces the holder,
wherein the coupling hole is formed in the catching projection.

4. The motor of claim 1, wherein the terminal holder part includes a first surface and a second surface opposing each other, the first surface facing the terminal parts and the second surface facing away from the terminal parts, and
the holder comprises first ribs disposed on the first surface of the terminal holder part and each disposed between adjacent terminal parts.

5. The motor of claim 4, wherein each of the first ribs is configured to continuously block, by extending in a diameter direction of the holder, a portion between the adjacent terminal parts.

6. The motor of claim 5, wherein each of the first ribs continuously connects the inner peripheral surface of the holder body to an innermost periphery of the terminal holder part.

7. The motor of claim 1, wherein the terminal holder part includes a first surface and a second surface opposing each other, the first surface facing the terminal parts and the second surface facing away from the terminal parts, and:

the holder comprises second ribs disposed on the second surface of the terminal holder part and each disposed between adjacent coils.

8. The motor of claim 1, wherein a first end of the terminal holder part is fixed to the inner peripheral surface of the holder body, and a second end of the terminal holder part is disposed as a free end.

9. The motor of claim 1, wherein the terminal holder part has terminal holes, and the coils pass through the terminal holes, respectively, and are electrically connected to the terminal parts.

10. The motor of claim 1, wherein the support member is integrated with the holder by injection molding.

11. A motor of comprising:
- a stator around which coils are wound;
- a terminal comprising a body disposed at one end of the stator, and terminal parts protruding from an inner peripheral surface of the body;
- a holder comprising a holder body configured to support the body, and a terminal holder part disposed on an inner peripheral surface of the holder body, the terminal holder part being configured to allow the terminal parts to be disposed thereon;
- a support member configured to support the terminal holder part; and
- a housing on which the holder is seated,
- wherein a first end of the support member is connected to the terminal holder part, and a second end of the support member is coupled to the housing,
- a locking protrusion is bent at the second end of the support member, and
- a locking part is disposed on the housing and configured to selectively lock the locking protrusion in accordance with a rotation of the housing relative to the holder.

12. The motor of claim 11, wherein the locking part comprises:
- a locking block having an insertion hole into which the locking protrusion is inserted; and
- an accommodation portion formed in the locking block so as to communicate with the insertion hole and configured to selectively accommodate the locking protrusion in accordance with the rotation of the housing relative to the holder,
- wherein the locking protrusion is locked to an inner surface of the locking block when the locking protrusion is accommodated in the accommodation portion.

13. A motor comprising:
- a stator around which coils are wound;
- a terminal comprising a body disposed at one end of the stator, and terminal parts protruding from an inner peripheral surface of the body;
- a holder comprising a holder body configured to support the body, and a terminal holder part disposed on an inner peripheral surface of the holder, the terminal holder part being configured to allow the terminal parts to be disposed thereon;
- a support member configured to support the terminal holder part; and
- an elastic layer disposed to surround at least a part of a peripheral surface of the holder.

14. The motor of claim 13, wherein the stator comprises:
- a plurality of split cores arranged to cooperatively define a ring shape; and
- a support ring configured to surround outer peripheral surfaces of the plurality of split cores, and
- wherein the support ring is disposed to partially surround the peripheral surface of the holder, and the elastic layer is interposed between the holder and the support ring.

* * * * *